United States Patent
Han et al.

(10) Patent No.: US 10,747,391 B2
(45) Date of Patent: Aug. 18, 2020

(54) METHOD AND DEVICE FOR EXECUTING APPLICATIONS THROUGH APPLICATION SELECTION SCREEN

(71) Applicant: SAMSUNG ELECTRONICS CO., LTD., Suwon-si (KR)

(72) Inventors: Kapsu Han, Ulsan (KR); Noyan Gunday, London (GB)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 218 days.

(21) Appl. No.: 14/851,115

(22) Filed: Sep. 11, 2015

(65) Prior Publication Data

US 2016/0077708 A1 Mar. 17, 2016

(30) Foreign Application Priority Data

Sep. 12, 2014 (GB) .................................. 1416161.6
Jun. 5, 2015 (KR) ........................ 10-2015-0080027

(51) Int. Cl.
G06F 3/0481 (2013.01)
G06F 3/0488 (2013.01)
G06F 3/0482 (2013.01)
G06F 3/0484 (2013.01)

(52) U.S. Cl.
CPC ........ *G06F 3/04817* (2013.01); *G06F 3/0482* (2013.01); *G06F 3/0488* (2013.01); *G06F 3/04842* (2013.01); *G06F 3/04845* (2013.01)

(58) Field of Classification Search
CPC ............... G06F 3/0481; G06F 3/04817; G06F 3/04845; G06F 3/04842; G06F 3/0482; G06F 3/0488
See application file for complete search history.

(56) References Cited

U.S. PATENT DOCUMENTS

| 7,216,305 B1* | 5/2007 | Jaeger .................... G06F 3/0481 345/419 |
| 7,441,201 B1 | 10/2008 | Printezis |
| 8,286,098 B2* | 10/2012 | Ju ........................ G06F 3/04817 455/414.1 |
| 8,423,911 B2 | 4/2013 | Chaudhri |

(Continued)

FOREIGN PATENT DOCUMENTS

| CN | 102770835 A | 11/2012 |
| CN | 103430135 A | 12/2013 |

(Continued)

OTHER PUBLICATIONS

Communication dated Mar. 13, 2015, issued by the Intellectual Property Office of the United Kingdom in counterpart British Patent Application No. GB1416161.6.

(Continued)

*Primary Examiner* — Ryan F Pitaro

(74) *Attorney, Agent, or Firm* — Sughrue Mion, PLLC

(57) ABSTRACT

A method of operating a display device includes displaying one or more entities and one or more application icons associated with the one or more entities on an application selection screen; receiving a first input selecting an application icon of the one or more application icons, while continuing to display the application selection screen; and executing an application associated with the selected application icon, in response to the first input.

18 Claims, 26 Drawing Sheets

(56) References Cited

U.S. PATENT DOCUMENTS

| | | | |
|---|---|---|---|
| 8,458,615 B2 | 6/2013 | Chaudhri | |
| 8,667,418 B2 | 3/2014 | Chaudhri et al. | |
| 8,681,105 B2* | 3/2014 | Huh | G06F 3/04815 345/156 |
| 8,745,535 B2 | 6/2014 | Chaudhri et al. | |
| 8,775,957 B2* | 7/2014 | Kim | G06F 1/1626 345/619 |
| 8,866,810 B2* | 10/2014 | Cho | G06F 1/1616 345/419 |
| 9,086,785 B2* | 7/2015 | Chaudhri | G06F 3/0483 |
| 9,323,451 B2* | 4/2016 | Yook | G06F 3/04886 |
| 9,378,588 B2* | 6/2016 | Song | G06F 3/04815 |
| 9,766,722 B2* | 9/2017 | Park | G06F 3/03543 |
| 2005/0270307 A1* | 12/2005 | Jacques Brouaux | G06F 3/0481 345/619 |
| 2007/0079255 A1* | 4/2007 | Gourdol | G06F 9/4443 715/815 |
| 2007/0198561 A1* | 8/2007 | Lee | G06F 3/0483 |
| 2008/0307361 A1* | 12/2008 | Louch | G06F 3/0481 715/835 |
| 2009/0019385 A1* | 1/2009 | Khatib | G06F 9/451 715/765 |
| 2009/0217206 A1* | 8/2009 | Liu | G06F 3/0481 715/846 |
| 2009/0307623 A1* | 12/2009 | Agarawala | G06F 3/04815 715/765 |
| 2010/0058193 A1* | 3/2010 | Sherrard | G06F 3/04817 715/738 |
| 2010/0083111 A1* | 4/2010 | de los Reyes | G06F 3/0482 715/702 |
| 2010/0138763 A1* | 6/2010 | Kim | G06F 1/1626 715/765 |
| 2011/0019662 A1* | 1/2011 | Katis | H04L 12/1831 370/352 |
| 2011/0029934 A1 | 2/2011 | Locker et al. | |
| 2011/0059775 A1* | 3/2011 | Choi | G06F 1/1694 455/566 |
| 2011/0093816 A1 | 4/2011 | Chang et al. | |
| 2011/0119629 A1 | 5/2011 | Huotari et al. | |
| 2011/0193788 A1* | 8/2011 | King | G06F 3/017 345/173 |
| 2011/0252346 A1* | 10/2011 | Chaudhri | G06F 3/04817 715/765 |
| 2011/0283238 A1* | 11/2011 | Weising | G06F 9/451 715/852 |
| 2012/0030623 A1* | 2/2012 | Hoellwarth | G06F 3/04817 715/811 |
| 2012/0054690 A1 | 3/2012 | Lim | |
| 2012/0056900 A1* | 3/2012 | Park | G06F 3/04815 345/653 |
| 2012/0188243 A1* | 7/2012 | Fujii | G06T 19/20 345/426 |
| 2012/0192110 A1* | 7/2012 | Wu | G06F 3/04815 715/815 |
| 2012/0216146 A1* | 8/2012 | Korkonen | G06F 3/04817 715/835 |
| 2012/0262398 A1* | 10/2012 | Kim | G06F 3/041 345/173 |
| 2012/0287071 A1* | 11/2012 | Wang | G06F 3/0486 345/173 |
| 2013/0031034 A1* | 1/2013 | Gubin | G06O 10/06393 706/12 |
| 2013/0127850 A1* | 5/2013 | Bindon | G06T 19/20 345/420 |
| 2013/0174069 A1 | 7/2013 | Lee | |
| 2013/0254719 A1 | 9/2013 | Hanazaki | |
| 2013/0346911 A1 | 12/2013 | Sripada | |
| 2014/0002387 A1* | 1/2014 | Hashiba | G06F 3/041 345/173 |
| 2014/0019544 A1* | 1/2014 | Palmert | G06F 15/17306 709/204 |
| 2014/0059447 A1* | 2/2014 | Berk | G06Q 10/10 715/751 |
| 2014/0289658 A1* | 9/2014 | Gelernter | G06F 9/451 715/765 |
| 2014/0317500 A1* | 10/2014 | Kim | G06F 3/0481 715/702 |
| 2014/0317544 A1* | 10/2014 | Wang | G06F 3/04817 715/769 |
| 2014/0331187 A1* | 11/2014 | Hicks | G06F 3/0488 715/845 |
| 2014/0344734 A1* | 11/2014 | Xu | G06F 3/0488 715/765 |
| 2015/0046831 A1* | 2/2015 | Liang | G06F 3/04817 715/741 |
| 2015/0074576 A1* | 3/2015 | Ma | G06F 3/0486 715/769 |
| 2015/0082189 A1* | 3/2015 | Baer | G06F 3/04842 715/752 |
| 2015/0346989 A1* | 12/2015 | Lee | G06F 9/4443 715/771 |
| 2015/0370424 A1* | 12/2015 | Joo | G06F 3/0488 715/830 |
| 2016/0124632 A1* | 5/2016 | Kamei | G06F 3/04817 715/769 |
| 2016/0139748 A1* | 5/2016 | Iwaizumi | G06F 3/0488 715/769 |
| 2016/0179329 A1 | 6/2016 | Wang et al. | |
| 2016/0202866 A1* | 7/2016 | Zambetti | G06F 3/0485 715/835 |
| 2016/0371815 A1* | 12/2016 | Patankar | G06T 3/4007 |
| 2017/0038946 A1* | 2/2017 | Deng | G06F 3/04817 |
| 2017/0039168 A1* | 2/2017 | Hassan | G06F 17/212 |
| 2017/0109013 A1* | 4/2017 | Hong | G06F 3/04817 |
| 2017/0147184 A1* | 5/2017 | Zhang | G06F 3/04845 |
| 2018/0077099 A1* | 3/2018 | Silva | H04L 51/16 |

FOREIGN PATENT DOCUMENTS

| | | |
|---|---|---|
| EP | 2 426 898 A2 | 3/2012 |
| EP | 2 426 898 A3 | 3/2012 |
| EP | 2 509 390 A1 | 10/2012 |
| JP | 2013-186525 A | 9/2013 |
| JP | 2013-200681 A | 10/2013 |
| KR | 10-2011-0038595 A | 4/2011 |
| KR | 10-2013-0091182 A | 8/2013 |
| KR | 10-2014-0079939 A | 6/2014 |
| WO | 2008/112759 A1 | 9/2008 |

OTHER PUBLICATIONS

Search Report dated Dec. 21, 2015, issued by the International Searching Authority in counterpart International Patent Application No. PCT/KR2015/009531 (PCT/ISA/210).
Written Opinion dated Dec. 21, 2015, issued by the International Searching Authority in counterpart International Patent Application No. PCT/KR2015/009531 (PCT/ISA/237).
Communication dated Mar. 29, 2018, issued by the State Intellectual Property Office of P.R. China in counterpart Chinese Application No. 201510582462.3.
Communication dated Apr. 13, 2018, issued by the European Patent Office in counterpart European Application No. 15840855.9.
Communication dated Jan. 16, 2019, issued by the State Intellectual Property Office of the People's Republic of China in counterpart Chinese Patent Application No. 201510582462.3.
Communication dated May 5, 2019 issued by the State Intellectual Property Office of P.R. China in counterpart Chinese Patent Application No. 201510582462.3.
Communication dated Dec. 4, 2019, issued by the State Intellectual Property Office of People's Republic of China in counterpart Chinese Application No. 201510582462.3.

* cited by examiner

METHOD AND DEVICE FOR EXECUTING APPLICATIONS THROUGH APPLICATION SELECTION SCREEN

CROSS-REFERENCE TO RELATED APPLICATION

This application claims benefit from Korean Patent Application No. 10-2015-0080027, filed on Jun. 5, 2015, in the Korean Intellectual Property Office, and British Patent Application No. 1416161.6, filed on Sep. 12, 2014, in the Intellectual Property Office of the United Kingdom, the disclosures of which are incorporated herein by reference in their entireties.

BACKGROUND

1. Field

Methods and apparatuses consistent with exemplary embodiments relate to executing applications.

2. Description of the Related Art

Modern electronic devices such as tablet computers and smartphones are capable of performing a wide variety of functions. A display device may include various applications that may be executed by a user in order to perform different functions.

The applications, which are commonly referred to as 'apps', may be pre-installed by a manufacturer and/or may be installed by a user. The user may install a plurality of applications in a display device. In a user interface, icons for executing the installed applications may be selected through a user interface. The user interface may include many pages of application selection screens, each displaying a limited number of icons. However, as the number of applications installed on the display device increases, it may be difficult for the user to navigate the application selection screens and locate a desired application. This is particularly problematic in display devices which only have limited display resources, such as smartphones in which a display may only be several inches across.

SUMMARY

Aspects of the exemplary embodiments relate to methods and apparatuses for executing applications through an application selection screen.

Additional aspects will be set forth in part in the description which follows and, in part, will be apparent from the description, or may be learned by practice of the presented exemplary embodiments.

According to an aspect of an exemplary embodiment, a method of operating a display device includes displaying one or more entities and one or more application icons associated with the one or more entities on an application selection screen; receiving a first input selecting an application icon of the one or more application icons, while continuing to display the application selection screen; and executing an application associated with the selected application icon, in response to the first input.

The method may further include, in response to receiving a touch input selecting a first entity of the one or more entities and dragging the first entity to a second entity of the one or more entities, wherein a first application icon of the one or more application icons is displayed inside the first entity, and a second application icon of the one or more application icons is displayed inside the second entity, merging the first entity with the second entity to create a merged entity; and displaying the first application icon and the second application icon inside the merged entity.

The method may further include determining a display size of the merged entity based on the number of the one or more application icons displayed inside in the merged entity; and displaying the merged entity in accordance with the determined display size.

The determining of the display size may include limiting the display size of the merged entity to a maximum display size, wherein the maximum display size is based on an upper limit.

The method may further include determining a maximum number of the one or more application icons to be displayed inside the merged entity; and displaying a number of application icons inside the merged entity, wherein the number of application icons is less than the maximum number.

The displaying may include: displaying the one or more entities as three-dimensional objects, and displaying two or more of the application icons inside the one or more entities in a manner that indicates that the two or more application icons have different depths.

The method may further include determining a new arrangement of the two or more application icons in accordance with a user input for rotation of the one or more entities; and displaying the two or more application icons using the new arrangement, while continuing to display the application selection screen.

The displaying may include displaying the one or more entities as two-dimensional objects; determining a new arrangement of the application icons included in the one or more entities in accordance with a user input of scrolling through the one or more entities; and displaying the application icons included in the one or more entities using the new arrangement, while continuing to display the application selection screen.

The method may further include receiving an input selecting a first application icon displayed inside a first entity of the one or more entities, wherein a second application icon is also displayed inside the first entity; receiving an input dragging the first application icon outside the first entity; creating a second entity; and displaying the second application icon inside the first entity and the first application icon inside the second entity.

The method may further include determining a new display size of the one or more entities based on a user input for resizing the one or more entities; and displaying the one or more entities in accordance with the determined new display size.

According to another aspect of an exemplary embodiment, a display device includes a display unit; one or more processors; and a memory configured to store computer program instructions executable by the one or more processors, including computer program instructions for: displaying one or more entities and one or more application icons associated with the one or more entities on an application selection screen; receiving a first input selecting an application icon of the one or more application icons, while continuing to display the application selection screen; and executing an application associated with the selected application icon, in response to the first input.

The memory may further store computer program instructions for: in response to receiving a touch input selecting a first entity among the one or more entities and dragging the first entity to a second entity of the one or more entities, wherein a first application icon of the one or more application icons is displayed inside the first entity, and a second application icon of the one or more application icons is displayed inside the second entity, merging the first entity with the second entity and creating a merged entity; and displaying the first application icon and the second application icon inside the merged entity.

The memory may further store computer program instructions for: determining a display size of the merged entity based on the number of the one or more application icons included in the merged entity; and displaying the merged entity in accordance with the determined display size.

The memory may further store computer program instructions for: limiting the display size of the merged entity to a maximum display size, wherein the maximum display size is based on an upper limit.

The memory may further store computer program instructions for: determining a maximum number of the one or more application icons to be displayed inside the merged entity; and displaying a number of application icons inside the merged entity, wherein the number of application icons is less than the maximum number.

The memory may further store computer program instructions for: displaying the one or more entities as three-dimensional objects and displaying two or more of the application icons inside the one or more entities in a manner that indicates that the two or more application icons have different depths.

The memory may further store computer program instructions for: determining a new arrangement of the two or more application icons in accordance with a user input for rotation of the one or more entities; and displaying the two or more application icons using the new arrangement, while continuing to display the application selection screen.

The memory may further store computer program instructions for: displaying the one or more entities as two-dimensional objects; and determining a new arrangement of the application icons included in the one or more entities in accordance with a user input of scrolling through the one or more entities; and displaying the application icons included in the one or more entities using the new arrangement, while continuing to display the application selection screen.

The memory may further store computer program instructions for: receiving an input selecting a first application icon displayed inside a first entity of the one or more entities, wherein a second application icon is also displayed inside the first entity; receiving an input dragging the first application icon outside the first entity; creating a second entity; and displaying the second application icon inside the first entity and the first application icon inside the second entity.

The memory may further store computer program instructions for: determining a new display size of the one or more entities based on a user input for resizing the one or more entities; and displaying the one or more entities in accordance with the determined new display size.

A non-transitory computer-readable storage medium may have stored thereon computer program instructions which, when executed in one or more processors, perform the methods above.

According to yet another aspect of an exemplary embodiment, a display device includes a display configured to display one or more entities and one or more application icons associated with the one or more entities on an application selection screen; a receiver configured to receive a first input selecting an application icon of the one or more application icons, while continuing to display the application selection screen; and a processor configured to execute an application associated with the selected application icon, in response to the first input.

According to a still further aspect of an exemplary embodiment, a method of operating a display device, includes displaying a first entity and a second entity on an application selection screen; displaying a first application icon inside the first entity, and a second application icon inside the second entity; receiving an input selecting the first entity and moving the first entity to within a first threshold distance from the second entity; receiving an input releasing the selection of the first entity; and in response to determining that the first entity is within a second threshold distance from the second entity when the input releasing the selection of the first entity is received, removing the first entity and displaying the first application icon and the second application icon inside the second entity.

The method may further include receiving an input for rotating the first application icon and the second application icon; and changing a position of the first application icon with respect to the second entity and a position of the second application icon with respect to the second entity in a manner that rotates the first application icon and the second application icon about a central axis of the second entity.

The method may further include receiving an input selecting a border of the second entity, dragging the border of the second entity to a new location on the application selection screen, and releasing the border of the second entity at the new location; determining a new display size of the second entity based on the new location; and displaying the second entity using the new display size.

The method may further include receiving an input selecting the first application icon and moving the first application icon outside of a third threshold distance from the second entity; receiving an input releasing the selection of the first application icon; in response to determining that the first application icon is outside of a fourth threshold distance from the second entity when the input releasing the selection of the first application icon is received, creating a third entity and displaying the first application icon inside the third entity and the second application icon inside the second entity.

According to an aspect of another exemplary embodiment, a display device includes a display unit; one or more processors; and a memory configured to store computer program instructions executable by the one or more processors, wherein the processor displays one or more entities each including an application icon on an application selection screen; receives a first input selecting an application icon from any one of the one or more entities, while continuing to display the application selection screen; and executes an application associated with the selected application icon, in response to the first input.

If a touch input on a first entity among the one or more entities and an input of dragging the first entity to a second entity are received, the processor may merge the first entity and the second entity and creating a merged entity; and display the application icon included in the first entity and the application icon included in the second entity inside the merged entity.

The processor may determine a display size of the merged entity based on the number of the application icons included in the merged entity; and display the merged entity in accordance with the determined display size.

The processor may add an upper limit to the display size and limit a maximum size of the merged entity.

The processor may determine a maximum number of the application icons that are to be displayed inside the merged entity; and display only application icons numbering less than the maximum number inside the merged entity.

The processor may display the one or more entities as 3D objects and display two or more of the application icons included in the entities to indicate different depths.

The processor may determine a new arrangement of the two or more application icons in accordance with a user input for rotation of the one or more entities; and display the two or more application icons again by using the new arrangement, while continuing to display the application selection screen.

The processor may display the one or more entities as 2D objects, determine a new arrangement of the application icons included in the one or more entities in accordance with a user input of scrolling through the one or more entities, and display the application icons included in the one or more entities by using the new arrangement, while continuing to display the application selection screen.

The processor may touch a first application icon in a third entity including first and second application icons, receiving an input of dragging the first application icon outside the third entity, create a new fourth entity, and display the third entity including the second application icon and the fourth entity including the first application icon.

The processor may determine a new display size of the one or more entities based on a user input for resizing the one or more entities; and display the one or more entities in accordance with the determined display size.

BRIEF DESCRIPTION OF THE DRAWINGS

The above and/or other aspects will become apparent and more readily appreciated from the following description of the exemplary embodiments, taken in conjunction with the accompanying drawings in which.

DETAILED DESCRIPTION OF EXEMPLARY EMBODIMENTS

Figure 1:
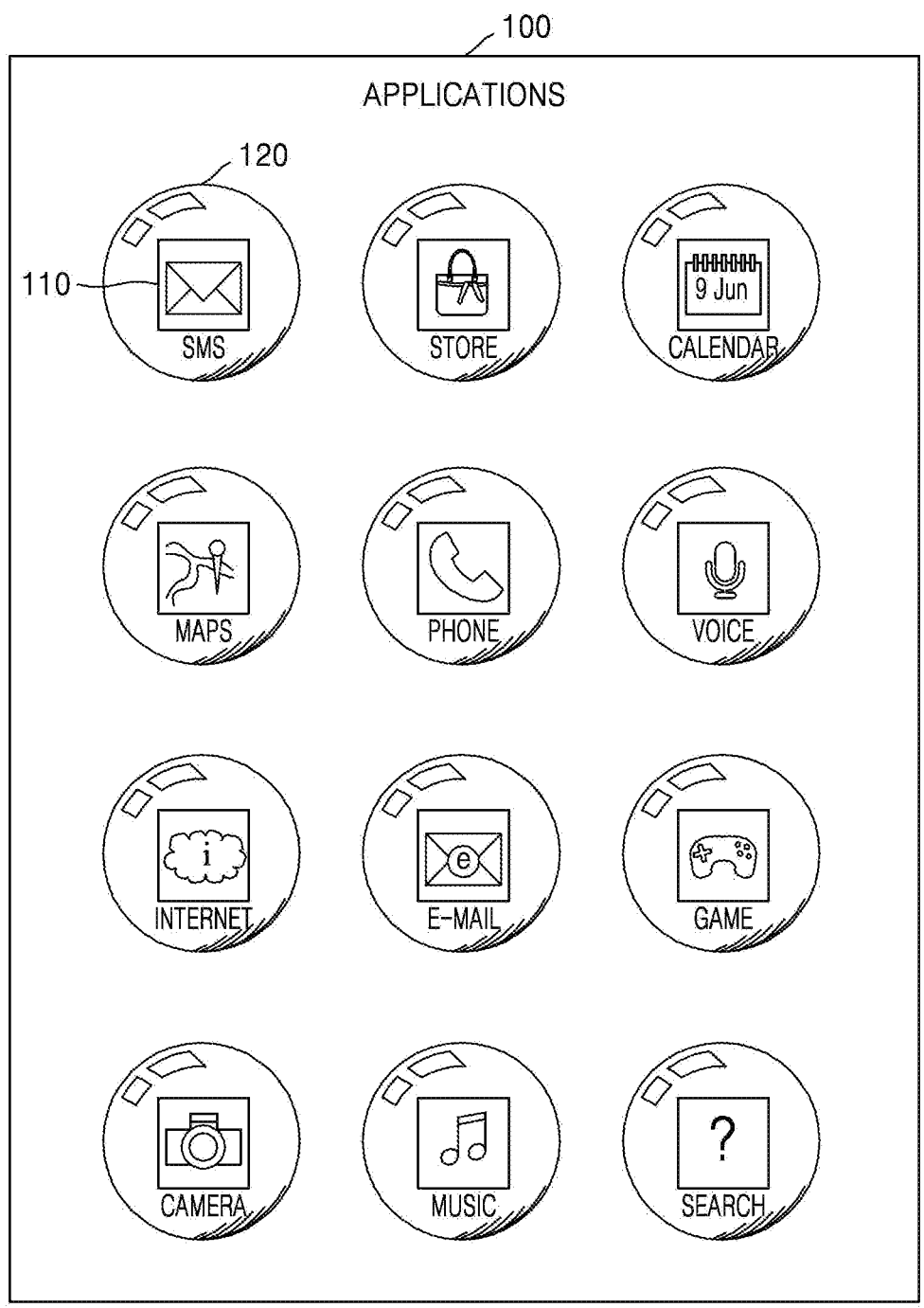
FIG. 1 illustrates an application selection screen including a plurality of entities, according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects.

As used herein, the term "and/or" includes any and all combinations of one or more of the associated listed items. Expressions such as "at least one of," when preceding a list of elements, modify the entire list of elements and do not modify the individual elements of the list.

FIG. 1 illustrates an application selection screen 100 including a plurality of entities, according to an exemplary embodiment. The application selection screen 100 is implemented in a user interface of a mobile communication display device (specifically a touch-enabled smartphone). However, this is only one example of a display device. In other exemplary embodiments, the application selection screen 100 may be applied in any type of display device, including but not limited to tablet, laptop and desktop computers, wearable devices such as smart watches, television screens, integrated tabletop display screens, infotainment systems such as in-car infotainment systems, and large-screen displays for applications such as business meetings and class room teaching.

Also, although the exemplary embodiments will be described with reference to touch-screen user interfaces, other exemplary embodiments may receive a user input through different types of interfaces. For example, in other exemplary embodiments, the user input may be received through a traditional pointing display device such as a mouse, trackpad or trackball, or via a non-contact method such as speech recognition, motion tracking, eye tracking, an eye blink interface, or a BCI (brain computer interface).

The application selection screen 100 illustrated in FIG. 1 may be used to control the display device to execute one of a plurality of applications. As shown in FIG. 1, the application selection screen 100 includes a plurality of application icons 110 displayed in a plurality of entities 120. In the exemplary embodiment, each entity 120 is displayed as a two-dimensional (2D) representation of a three-dimensional (3D) object, which in the exemplary embodiment is a translucent, substantially spherical bubble. The entities 120 may include suitable shading and/or highlights configured to give the impression of a three-dimensional object to a viewer. Depending on the exemplary embodiment, the entities 120 may be displayed on a 2D display unit or on a 3D display unit.

To control the display device to execute one of the plurality of applications, a user may select an application icon associated with a desired application that is to be executed. In other words, the user may select the application icon and execute an application corresponding to the selected application icon. For example, to execute a text messaging application, the user may select the messaging icon 110 displayed in a first one of the entities 120. In response to an input selecting the messaging application icon 110 being received whilst the application selection screen 100 is displayed, the display device may execute an application (in this case, the text messaging application) associated with the selected application icon.

Specifically, the application selection screen 100 illustrated in FIG. 1 may appear similar to an application selection screen in which application icons are displayed separately for different applications. However, the application selection screen 100 of the present exemplary embodiment differs in that the application icons 110 are contained in the entities 120 which may be configured to more effectively utilize an available display space.

Specifically, in some exemplary embodiments, a plurality of application icons 110 may be accessed through a single entity 120 in the application selection screen 100, and increase the number of applications that may be accessed through a particular user interface screen.

Figure 2A:
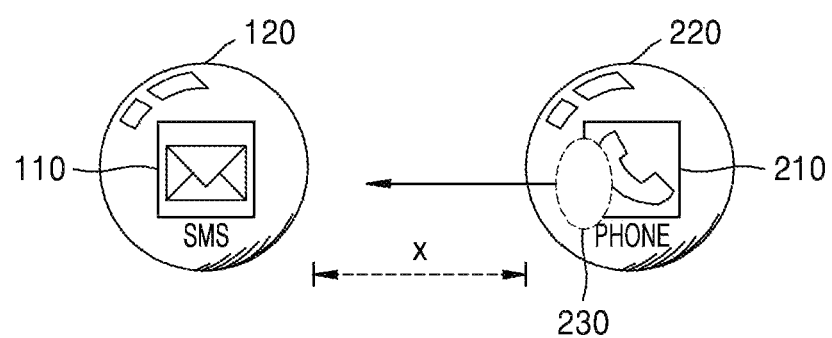
FIGS. 2A to 2C illustrate operations of creating a merged entity, according to an exemplary embodiment.
Figure 2B:
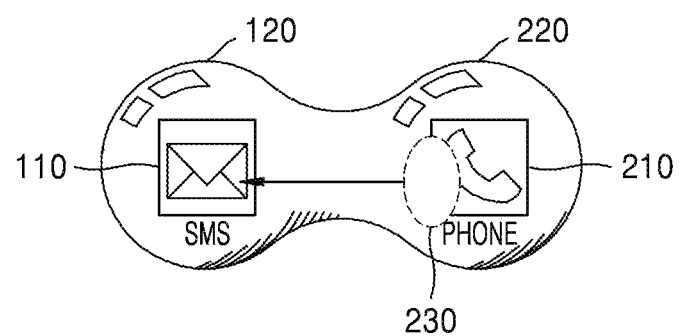
Figure 2C:
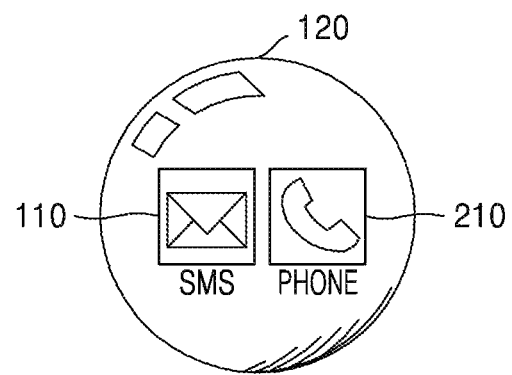

FIGS. 2A to 2C illustrate operations of creating a merged entity, according to an exemplary embodiment. The creation of the merged entity will be described below in the context of a user input received through a touch-screen display unit. However, as explained above, the exemplary embodiments are not limited to use with touch-screen interfaces and in other exemplary embodiments the user input may be received differently.

As shown in FIG. 2A, to create the merged entity, a user selects a first entity 220 including a first application icon 210 and drags the first entity 220 towards a second entity 120 including a second application icon 110. In the exemplary embodiment, a user input 230 selecting and dragging the first entity 220 is received as a touch-and-drag event through the touch-screen display unit. Although in the exemplary embodiment, the first and second entities 220 and 120 each include a single application icon before creating the merged entity, in other exemplary embodiments, at least one of the entities 220 and 120 may already include a plurality of application icons before merging. As the user drags the first entity 220 around the application selection screen 100, a display device repeatedly checks a distance X between the first entity 220 and the second entity 120.

In response to the first user input 230 dragging the first entity 220 to within a first threshold distance C1 from the second entity 120 while continuing to select the first entity 220, visual feedback is displayed to indicate merging of the first and second entities 220 and 120 into the merged entity. In the exemplary embodiment the visual feedback takes the form of an animation showing the bubble of the first entity 220 beginning to join with the bubble of the second entity 120, as shown in FIG. 2B. The visual feedback informs the user that the entities 220 and 120 will be merged if the user releases the first entity 220 at a current position. Similarly, if the first entity 220 is subsequently dragged further than a second threshold distance C2 away from the second entity 120, further visual feedback may be displayed to indicate splitting of the merged entity back into the first and second entities 220 and 120.

Although the visual feedback is displayed as an animation in the exemplary embodiment, in other exemplary embodiments different forms of visual feedback may be used. Examples of other types of visual feedback that may be used include a displayed message to indicate that the entities will be merged in their current positions, a change in color of one or both of the entities, a shade effect such as a lighting effect applied to one or both of the entities, and a change in size of one or both of the entities.

Furthermore, in other exemplary embodiments a different type of feedback, such as audio or haptic feedback, may be provided instead of or in addition to visual feedback. In response to the user releasing the first entity 220 within the second threshold distance C2 of the second entity 120, the first application icon 210 is added to the second entity 120, and the first entity 220 is removed from the application selection screen 10. The second entity 120 may now be referred to as a 'merged' entity since the second entity 120 includes the application icons 210 and 110 which were previously contained in the separate entities 220 and 120.

The second threshold distance C2 may be the same as the first threshold distance C1, or may have a different value. For example, the second threshold distance C2 may be greater than the first threshold distance C1. This has the effect that entities will begin to merge at a certain separation and must then be dragged further apart in order to cancel the operation, lending a 'sticky' character to the entities. This hysteresis-like effect may be particularly advantageous when a small display screen is used, since it is less critical for a user to accurately release the dragged entity in very close proximity to the target (merged) entity. Instead, the user only has to drag the first entity 220 to within a certain distance (C1) of the second entity 120 to trigger merging, and may then release the first entity 220 anywhere within a larger radius (C2) of the second entity 120 to confirm the operation. In the exemplary embodiment, releasing the first entity 220 within the second threshold distance C2 represents a request to merge the first and second entities 220 and 120. In other exemplary embodiments, the request to merge the two entities 220 and 120 may be received in a different manner. For example, in a multi-touch user interface, the user may simultaneously tap-and-hold (long pressing) both entities to be merged, and the tap-and-hold may be interpreted as a request to merge the entities in response to both entities being held for longer than a predetermined time. Alternatively, an input whereby the user throws (tap-and-drag) the first entity 220 in a direction in which the second entity 120 is located may be interpreted as a request to merge the two entities. The input may be applied when a user dragging speed exceeds a threshold speed.

Also, in the exemplary embodiment the first selected entity 220 is removed when the two entities 220 and 120 are merged. However, in other exemplary embodiments the second entity 120 may be removed instead, with the second application icon 110 being added to the first entity 220. Whether the first entity 220 or the second entity 120 persists after merging the entities 220 and 120 will depend on how software instructions are configured to manage the entities 220 and 120 in memory. As a further alternative, in some exemplary embodiments the first entity 220 and the second entity 120 may both be removed, and a new entity may be created to hold the application icons 210 and 110 from both entities 220 and 120.

As shown in FIG. 2C, in the exemplary embodiment a size of the entity 120 is increased when the other application icon 210 is added to the entity 120. When merging entities in this way, the display device may determine a new display size of the merged entity 120 and display the merged entity 120 according to the new display size. In some exemplary embodiments, the new display size may be determined based on a predefined rule which imposes an upper limit on the size for the merged entity 120. This approach may avoid a single entity expanding to fill the entire display area when many application icons are added to the same entity. In the exemplary embodiment, the new display size may be calculated based on a geometric series of the form:

$$A_{merged} = A_0 + \left(a - \frac{b}{c^n}\right)$$

where $A_{merged}$ denotes the display size of the merged entity, $A_0$ denotes a predefined size, n denotes the number of application icons to be displayed in the merged entity, and a, b and c denote constants. In this regard, 'size' may refer to a linear dimension, an area, or a volume. For example, the display size and the predefined size may be defined as a linear dimension such as the radius, diameter or circumference of a 2D object or a representation of a 3D object. Alternatively, the size may be defined in terms of a display area, for instance a number of pixels, or as a three-dimensional volume when the entities are displayed as representations of 3D objects.

The display device may merge the entities as shown in FIGS. 2A to 2C, and, in some exemplary embodiments the display device may also split an entity which contains a plurality of application icons into separate entities, each holding one or more application icons.

Figure 3A:
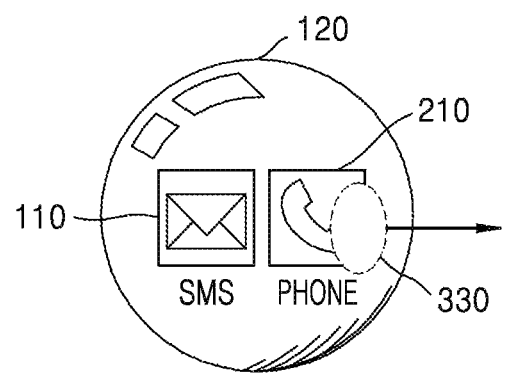
FIGS. 3A to 3C illustrate operations of splitting an entity which contains a plurality of icons, according to an exemplary embodiment.
Figure 3B:
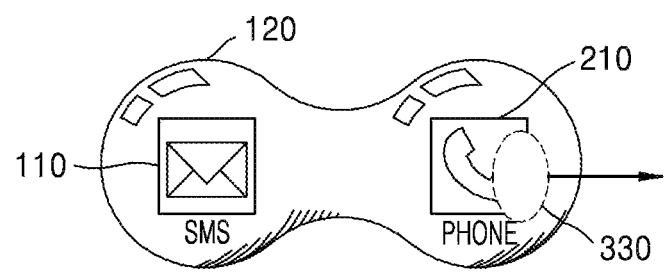
Figure 3C:
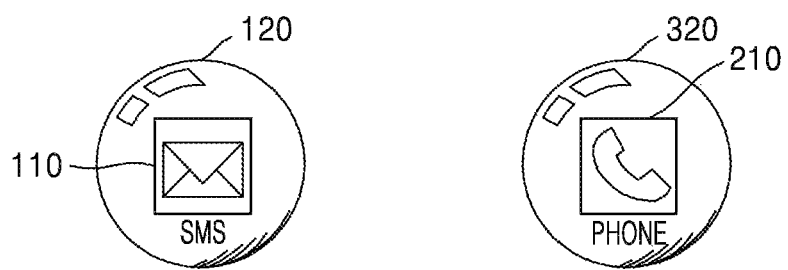

FIGS. 3A to 3C illustrate operations of splitting an entity which contains a plurality of icons, according to an exemplary embodiment. In the example shown in FIGS. 3A to 3C the entity 120 being split is similar to the merged entity created in FIG. 2C, however, it will be appreciated that the method may be applied to any entity which includes two or more application icons.

First, as shown in FIG. 3A a user input 330 is received which selects and holds the first application icon 210 within the entity 120. In other words, a display device receives the user input 330 that maintains a status of the first application icon 210 that it has when it is touched. Then, in response to the user input 330 dragging the selected application icon 210 further than a third threshold distance C3 away from the entity 120, the display device may split the entity 120. In other words, the display device may split the entity 120 into entities 120 and 320. The third threshold distance C3 may be the same as or may be different from the first threshold distance C1 used to initiate merging of entities.

Visual feedback may be displayed to indicate creation of the new entity 320 containing the first application icon 210, as shown in FIG. 3B. In an exemplary embodiment, the visual feedback may include an animation that is the reverse of the one displayed in FIG. 2B. However, in other exemplary embodiments the visual feedback may take different forms. As discussed above with respect to FIG. 2B, corresponding visual feedback may subsequently be displayed to indicate merging of the original entity 120 and the new entity 320, in response to the selected application icon 210 being dragged back to within a fourth threshold distance C4 from the entity 120. The fourth threshold distance C4 may be the same as or may be different from the second threshold distance c2 used in a merging operation. Furthermore, as with the merging operation, in other exemplary embodiments a different type of feedback may be provided during a splitting operation, such as audio or haptic feedback, instead of or in addition to visual feedback.

As shown in FIG. 3C, the display device may receive a request to split the entity 120. For example, in response to the user releasing the first application icon 210 further than the fourth threshold distance C4 away from the original entity 120, the display device creates the new entity 320 to contain the first application icon 210. The original entity 120 persists, and retains the remaining icons 110 other than the one which was removed. Similar to the merging operation, the fourth threshold distance C4 used to confirm splitting may be the same as the third threshold distance C3 used to initiate splitting or may have a different value. For example, the threshold distance C4 may be greater than the third threshold distance C3.

As in the above-described example of entities being merged, when the entity 120 is split into the entities 120 an 320 as shown in FIG. 3C, the display device may calculate a display size of the entity 120 based on the number of icons that remain in the entity 120. The display device updates a size of the entity 120 to the calculated display size. As the new entity 320 only holds the single icon 210, a default size may be used for the new entity 320.

Using the methods described with reference to FIGS. 2A to 3C, a user may configure the application selection screen 100 of FIG. 1 by creating one or more entities which include a plurality of icons. An entity which includes a plurality of application icons may be referred to as a group entity. Applications may then be executed directly from the application selection screen 100 by selecting the corresponding application icon within the group entity. In this way, a group entity may be distinct from a folder-based user interface, in which a user must first open a folder in order to view and select contents included in the folder.

Figure 4A:
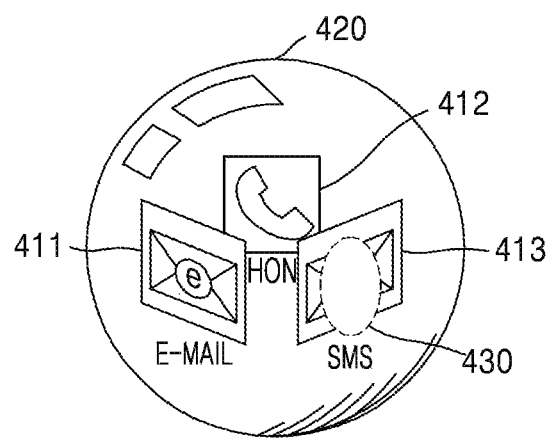
FIGS. 4A to 4C illustrate executing various applications from a group entity, according to an exemplary embodiment.
Figure 4B:
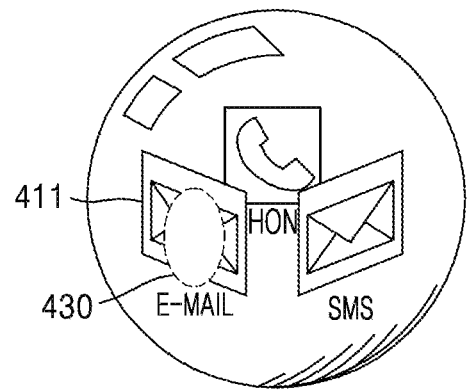
Figure 4C:
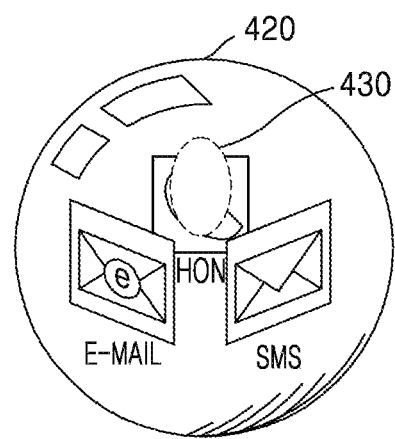

FIGS. 4A to 4C illustrate executing various applications from a group entity, according to an exemplary embodiment. In the exemplary embodiment a group entity 420 includes three application icons 411, 412, 413, which are associated respectively with an email application, a phone application, and a text messaging application. The application icons 411, 412, 413 are distributed at different depths within the three-dimensional entity 120 in order to allow the application icons 411, 412, 413 to be partially overlapped, making more efficient use of the available display area. The use of three-dimensional entities as illustrated in FIGS. 4A to 4C may be particularly advantageous when an UI is implemented in a device with a small display screen, for example a wearable device such as a smartwatch. In the exemplary embodiment the application icons 411, 412, 413 are mapped onto the surface of a sphere. In some exemplary embodiments, additional application icons may also be displayed on predefined layers within the sphere.

As shown in FIG. 4A, when a touch event 430 is received on the text messaging icon 413 whilst an application selection screen is being displayed, a display device responds by executing the text messaging application. When a touch event is described as being received "on" a particular application icon, in exemplary embodiments this can mean that a touch event is detected, received, or recorded at a location on a touch-sensitive screen, the location corresponding to a location of the application icon. Similarly, as shown in FIGS. 4B and 4C, when a touch event 430 is received on the email icon 411 or the phone icon 412 whilst the application selection screen is being displayed, the display device responds by executing the email application or the phone application as appropriate.

In the exemplary embodiment, the group entity 420 may be rotated, that is, the application icons within the group entity 420 may change position relative to one another as if they are being rotated about a central axis, in order to more easily access icons which are currently displayed behind the other icons 411 and 413 within the entity 420, such as the phone icon 412 in FIG. 4A.

Figure 5A:
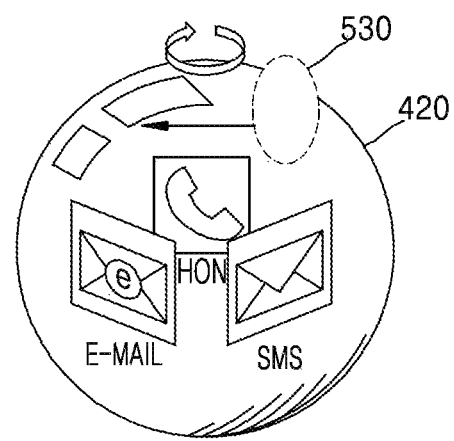
FIGS. 5A and 5B illustrate rotating a group entity, according to an exemplary embodiment.
Figure 5B:
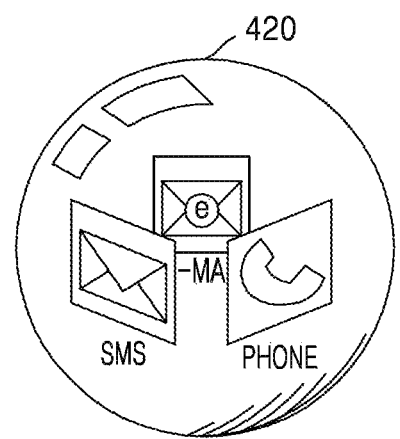

FIGS. 5A and 5B illustrate rotating the group entity 420, according to an exemplary embodiment. Alternatively, a display device may rotate application icons included in the group entity 420. The display device may rotate the application icons to change depths of the application icons. In the exemplary embodiment, in response to a request to rotate the three-dimensional entity 420, which is received as a touch-and-drag event 530 within the boundary of the entity 420, the display device determines a new arrangement of application icons within one of a plurality of entities, based on a rotation of a three-dimensional object in accordance with a user input. Then, as shown in FIG. 5B, the display device displays the entity 420 again using the new arrangement of application icons. A user may rotate any group entity as shown in FIGS. 5A and 5B whenever the application selection screen is being displayed.

Various parameters relating to the rotation of an entity may be configured, including:
1. Enable/Disable ability to spin.
2. Speed of swiping gesture to be recognized as a user input to spin the entity.
3. Area from which the swiping gesture should be started in order to spin the entity.
4. Policy for swiping gesture to distinguish between swiping gesture on entity and swiping gesture on parent view of the entity.
5. Policy of movement of positions of items while spinning.

Furthermore, in an exemplary embodiment the ability to select and execute applications from icons at the rear of the entity, such as the phone icon 412 in FIG. 4A, may be disabled. Instead, the user may rotate the entity as shown in FIGS. 5A and 5B, to bring the desired icon to the front in order to select the icon and execute the associated application. In other words, the user may rotate the entity 420 to execute the phone application as shown in FIGS. 5A and 5B.

Instead of, or in addition to, rotating a group icon as shown in FIGS. 5A and 5B, in certain exemplary embodiments the display device may be configured to enable a user to zoom in or out of a group icon in order to more easily access partially hidden icons.

Figure 6A:
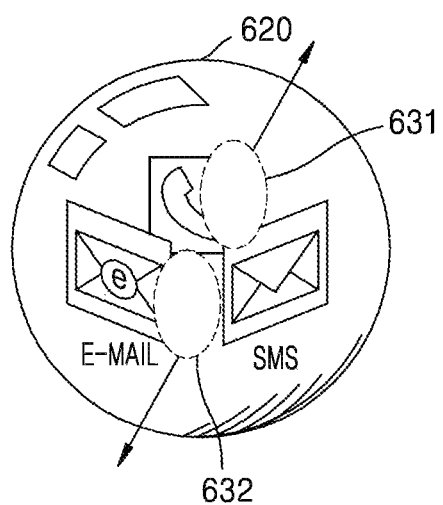
FIGS. 6A and 6B illustrate rearranging icons within a group entity while zooming, according to an exemplary embodiment.
Figure 6B:
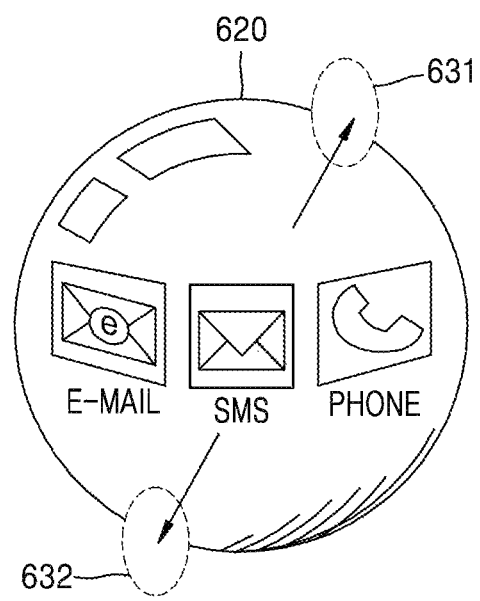

FIGS. 6A and 6B illustrate rearranging icons within a group entity 620 when zooming, according to an exemplary embodiment. FIGS. 6A and 6B illustrate how application icons may be rearranged within the group entity 620 when a user zooms in/out on the entity 620, that is, when changing a display size of the entity 620. In the exemplary embodiment, a request to resize the entity 620 is received in a pinch-to-zoom manner through a touch-screen display, by touching two contact points 631 and 632 and dragging apart to enlarge the entity 620. Similarly, the display size of the entity 620 may be reduced by performing the reverse operation, that is, by touching two widely separated points over the entity 620 and dragging toward each other.

As shown in FIG. 6B, a new display size is determined in accordance with the user input. In the exemplary embodiment, as the touch points 631 and 632 are moved beyond a boundary of the entity 620, a diameter of the entity 620 is increased in accordance with current positions of the touch points 631 and 632. Once the entity 620 has been expanded beyond a threshold size, which may depend on the number of application icons included in the entity 620, the application icons inside are rearranged automatically. In some exemplary embodiments the application icons may also be enlarged, to allow a user to more easily select a desired application. As shown in FIG. 6B, the application icons are displayed in an independent space so that the application icons are not located behind a different application icon. In FIG. 6B, the user may select one of an email icon, a text messaging icon, and a phone icon without the rotation of the entity 620. The user may enlarge or shrink any group entity using this method, whenever the application selection screen is being displayed.

Figure 7:
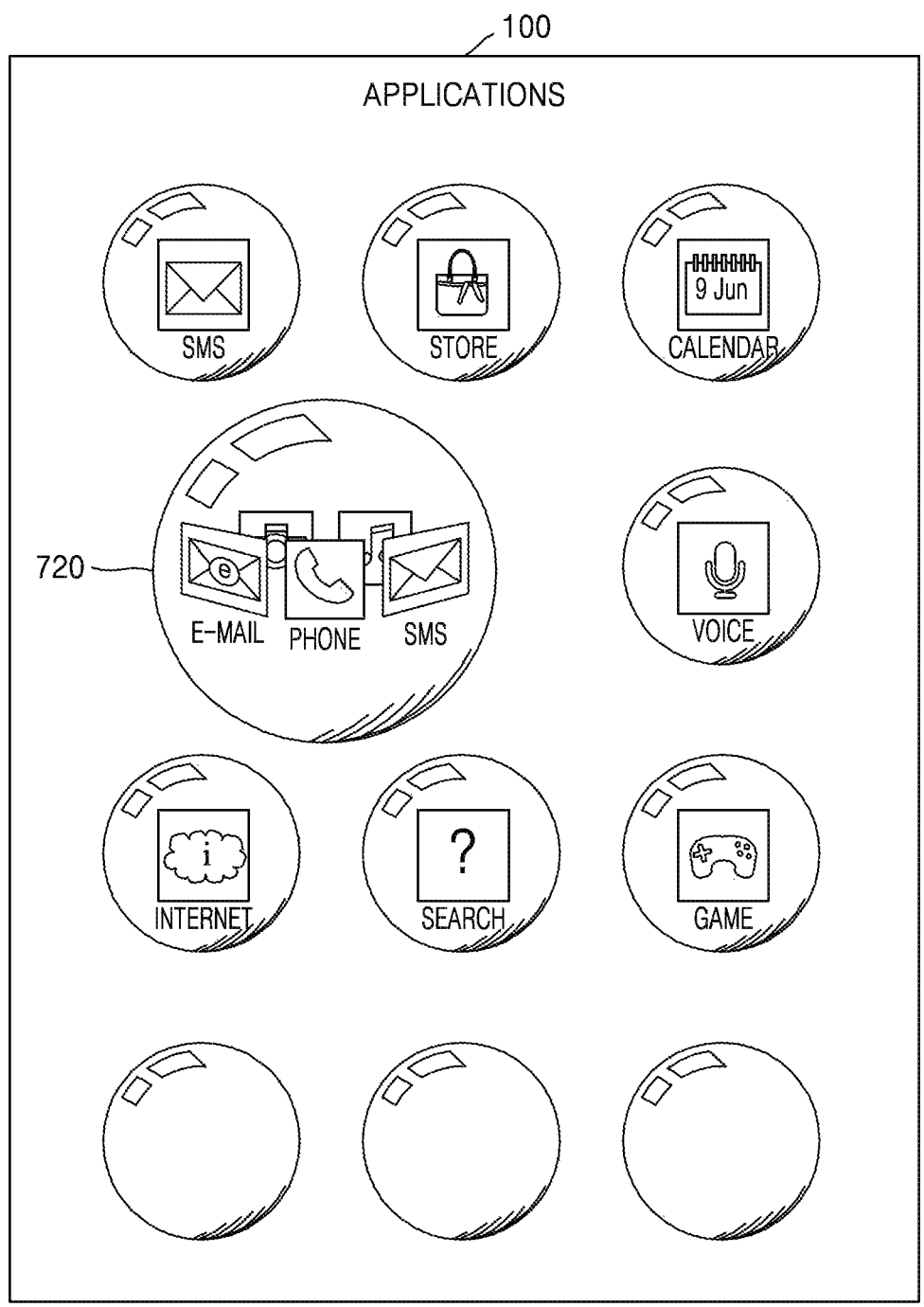
FIG. 7 illustrates an application selection screen including a plurality of entities and a group entity, according to an exemplary embodiment.

FIG. 7 illustrates the application selection screen 100 including a plurality of entities and a group entity 720, according to an exemplary embodiment. Referring to FIG. 7, five application icons from the application selection screen 100 of FIG. 1 have been merged into the single group entity 720, which occupies approximately the same area as two other entities in the original application selection screen 100. As shown in FIG. 7, this has created space at the bottom of the application selection screen 100 for two new entities to be added, which are waiting to be populated with application icons. In the exemplary embodiment, to add an application icon to an empty entity, a user may press (tap and hold) an empty entity for a certain time, at which point a display device displays a list of currently unused applications. The unused applications are applications which are not currently included in the application selection screen 100. The user may then select one or more applications from the list. Associated application icons will be added to the empty entity. In other exemplary embodiments, different methods may be used to add new application icons to the application selection screen 100. For example, the user may drag an existing application icon from another page of an application menu (second application selection screen) onto a current page (first application selection screen).

Exemplary embodiments have been described in relation to 3D entities, that is, entities which are displayed as representations of 3D objects. However, in other exemplary embodiments the entities may be displayed as 2D objects.

Figure 8A:
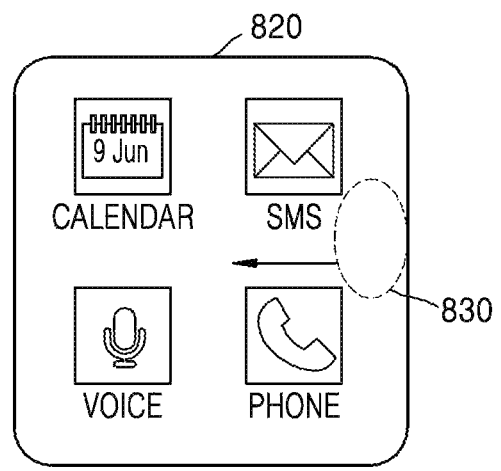
FIGS. 8A to 8C illustrate scrolling through applications within a 2-dimensional group entity, according to an exemplary embodiment.
Figure 8B:
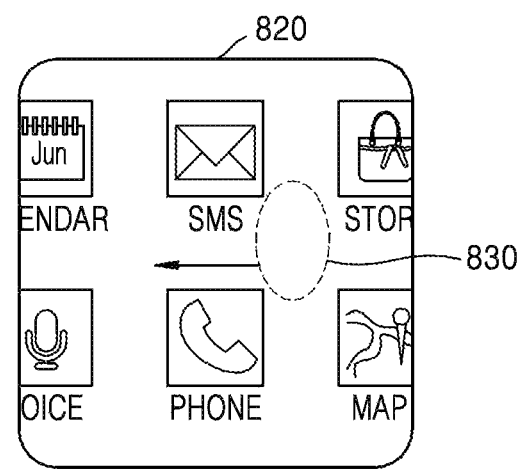
Figure 8C:
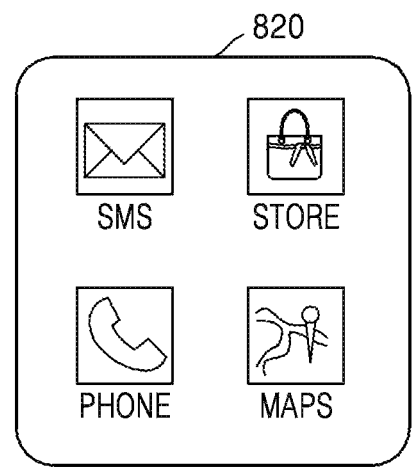

FIGS. 8A to 8C illustrate scrolling through applications within a 2-dimensional group entity 820, according to an exemplary embodiment.

In the exemplary embodiment, application icons may not be displayed at different depths within the group entity 820 since a 2D object is used to indicate the group entity 820. In the exemplary embodiment, to avoid a size of the group entity 820 increasing undesirably when many icons are added to the group entity 820, a display device is configured to display up to a maximum number of application icons arranged on a two-dimensional grid within the group entity 820. When the group entity 820 includes more application icons than a maximum number, which in the exemplary embodiment is four, excess application icons are not displayed in the group entity 820.

To access hidden icons, a user may tap and swipe across the group entity 820 in a horizontal and/or vertical direction, as shown in FIG. 8A. In response to a user input 830 including a request to scroll through the application icons within the group entity 820, the display device scrolls through the plurality of application icons as shown in FIGS. 8A to 8C in a direction indicated by the user input 830, to display the previously-hidden application icons.

In FIGS. 8A to 8C, the group entity 820 includes six application icons (a calendar icon, a message icon, a voice icon, a phone icon, a store icon, and a map icon). When a maximum number of icons that may be displayed by the single group entity 820 is set as 4, as shown in FIG. 8A, the display device includes only four application icons (the calendar icon, the message icon, the voice icon, and the phone icon) within the group entity 820. In FIG. 8B, if the user input 830 is received, and the user drags the group entity 820 to the left while touching inside the group entity 820, the display device partially displays the application icons (the store icon and the map icon) that were not displayed earlier, and partially displays the application icons (the calendar icon and the voice icon) that were previously displayed on the left. In FIG. 8C, if the user input 830 ends, the display device removes the application icons (the calendar icon and the voice icon) that were previously displayed in the group entity 820 on the left, and displays the other application icons (the message icon, the phone icon, the store icon, and the map icon). Methods of controlling the display device will now be described within reference to FIGS. 9 to 14. Any of these methods may be implemented using software instructions stored in computer-readable memory, which when executed by one or more processors within the display device, cause the device to perform the method.

Figure 9:
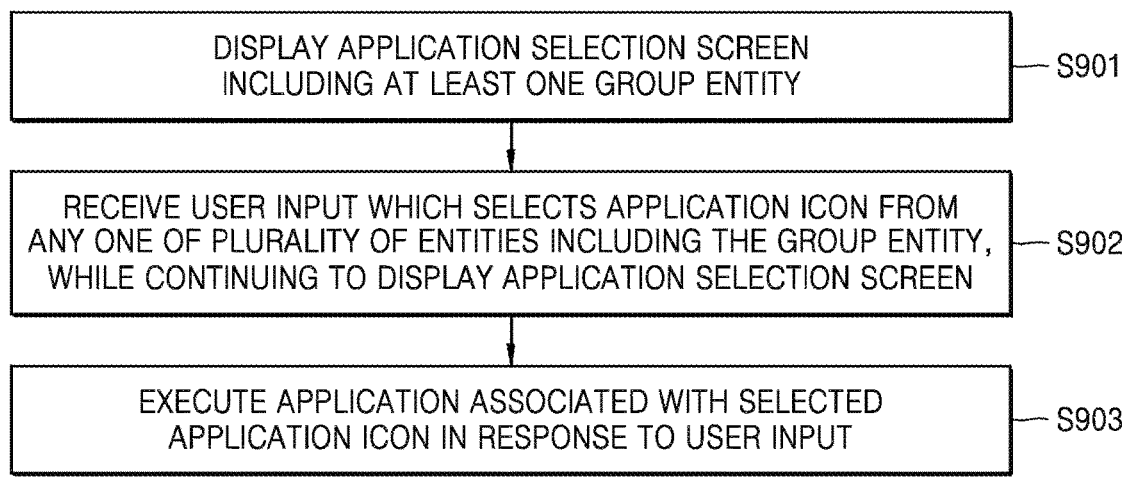
FIG. 9 is a flowchart of a method of controlling a display device, according to an exemplary embodiment.

FIG. 9 is a flowchart showing a method of controlling a display device, according to an exemplary embodiment.

In operation S901, an application selection screen such as the one shown in FIG. 7 is displayed on a display unit, the application selection screen including at least one group entity. In other words, the display device displays at least one entity including an application icon on the application selection screen.

In operation S902, a user input is received which selects an application icon from any one of a plurality of entities, the plurality of entities including the group entity, while continuing to display the application selection screen.

In operation S903, the display device is controlled to execute an application associated with the selected application icon, in response to the user input.

Figure 10:
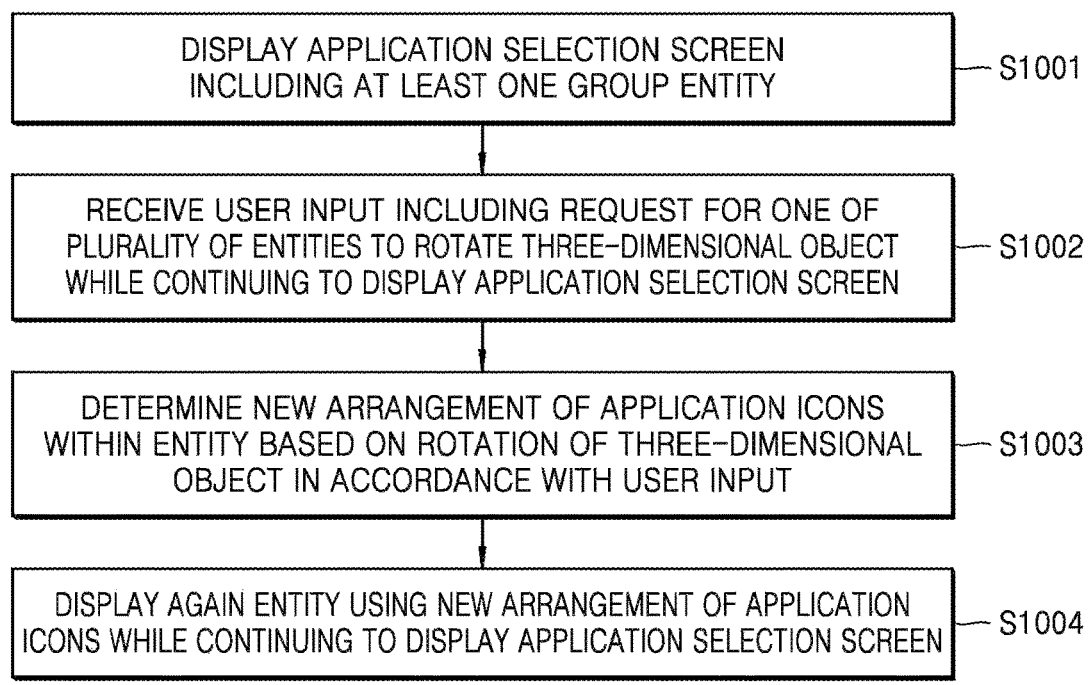
FIG. 10 is a flowchart of a method of rotating icons within a three-dimensional entity, according to an exemplary embodiment.

FIG. 10 is a flowchart showing a method of rotating icons within a three-dimensional entity, according to an exemplary embodiment. A display device may rotate a group entity as shown in FIGS. 5A and 5B. A user may more easily select icons towards the rear of a 3D entity.

In operation S1001, an application selection screen such as the one shown in FIG. 7 is displayed.

In operation S1002, the display device receives a user input including a request for one of a plurality of entities to rotate the three-dimensional object while continuing to display the application selection screen.

In operation S1003, the display device determines a new arrangement of application icons within the entity, based on a rotation of the three-dimensional object in accordance with the user input.

In operation S1004, the display device displays again the entity using the new arrangement of application icons, while continuing to display the application selection screen.

Figure 11:
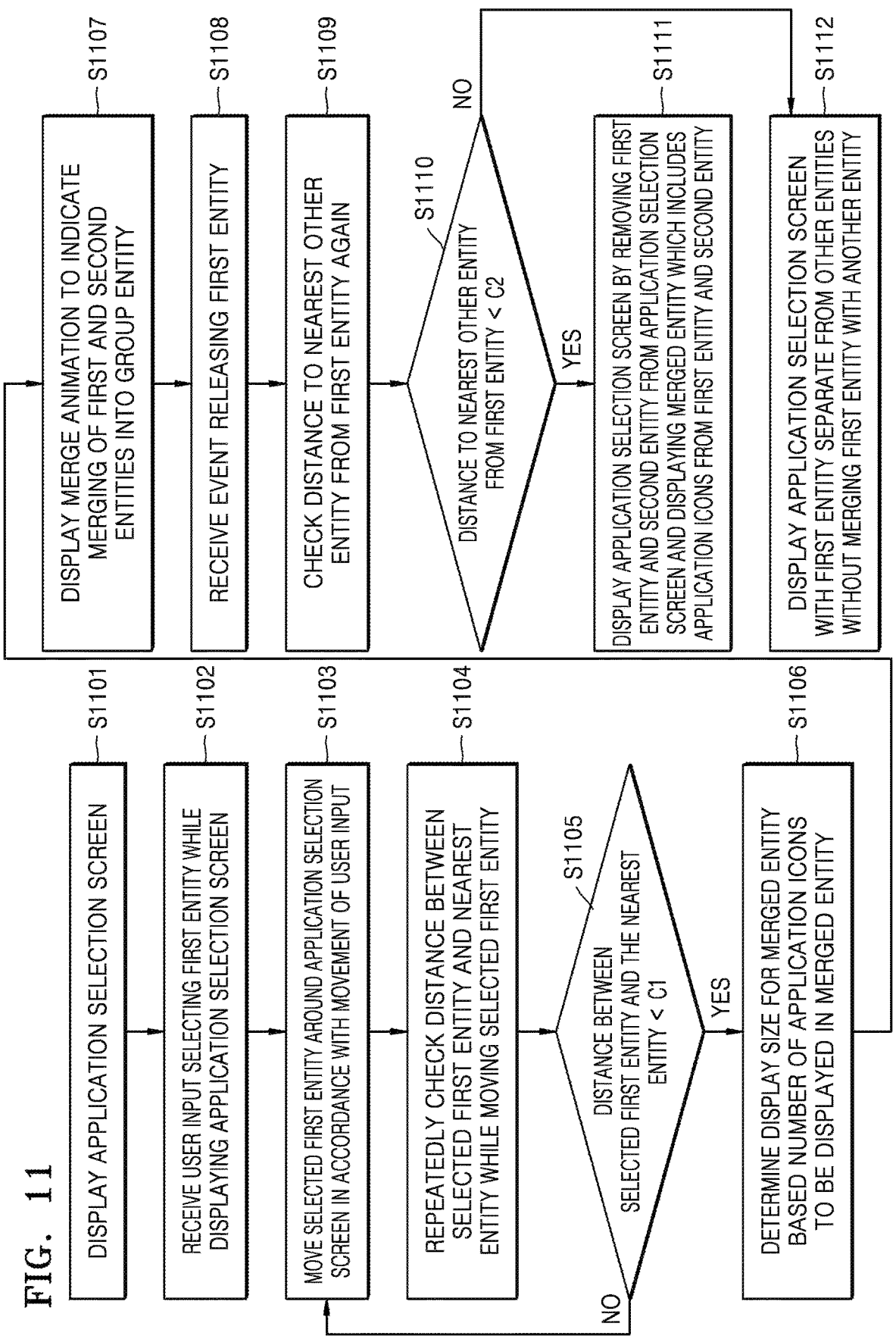
FIG. 11 is a flowchart of a method of merging entities in an application selection screen, according to an exemplary embodiment.

FIG. 11 is a flowchart showing a method of merging entities in an application selection screen, according to an exemplary embodiment. The method may be used to merge entities as shown in FIGS. 2A to 2C, enabling more application icons to be added to an application selection screen.

In operation S1101, a display device displays the application selection screen such as the one shown in FIG. 7.

In operation S1102, the display device receives a user input selecting a first entity while displaying the application selection screen. In the exemplary embodiment, the user input is received as a touch and drag event through a touch-screen display unit, but in other exemplary embodiments a different type of interface may be used.

In operation S1103, the selected first entity is moved around the application selection screen in accordance with the movement of the user input.

In operation S1104, the display device repeatedly checks a distance between the selected first entity and the nearest entity while moving the selected first entity.

In operation S1105, the display device checks whether the distance between the selected first entity and the nearest entity is smaller than the first threshold distance C1.

In response to the selected first entity being dragged to within the first threshold distance C1 from a second entity while a user continues to select the first entity, in operation S1106, the display device determines a display size for a merged entity based the number of application icons to be displayed in the merged entity.

In operation S1107, a merge animation is displayed to indicate merging of the first and second entities into a group entity, as shown in FIG. 2B.

In operation S1107, the display device may subsequently display further visual feedback to indicate splitting of the merged entity back into separate entities, in response to the user input dragging the first entity further than the second threshold distance C2 away from the second entity.

In operation S1108, the display device receives an event releasing the first entity. In operation S1109, the display device checks the distance to the nearest other entity from the first entity again in response to the released first entity. In response to the first entity being released within the second threshold distance C2 of another entity, the display device determines that the user input includes a request to merge the first and second entities.

In operation S1110, the display device determines whether the distance to the nearest other entity from the first entity is smaller than the second threshold distance C2.

In operation S1111, the display device continues to display the application selection screen by removing the first entity and the second entity from the application selection screen and displaying a merged entity which includes the application icons from the first entity and the second entity, as shown in FIG. 2C.

In operation S1112, in response to the first entity being released further than the second threshold distance C2 from any other entity, the display device continues to display the application selection screen with the first entity separate from other entities, that is, without merging the first entity with another entity.

Figure 12:
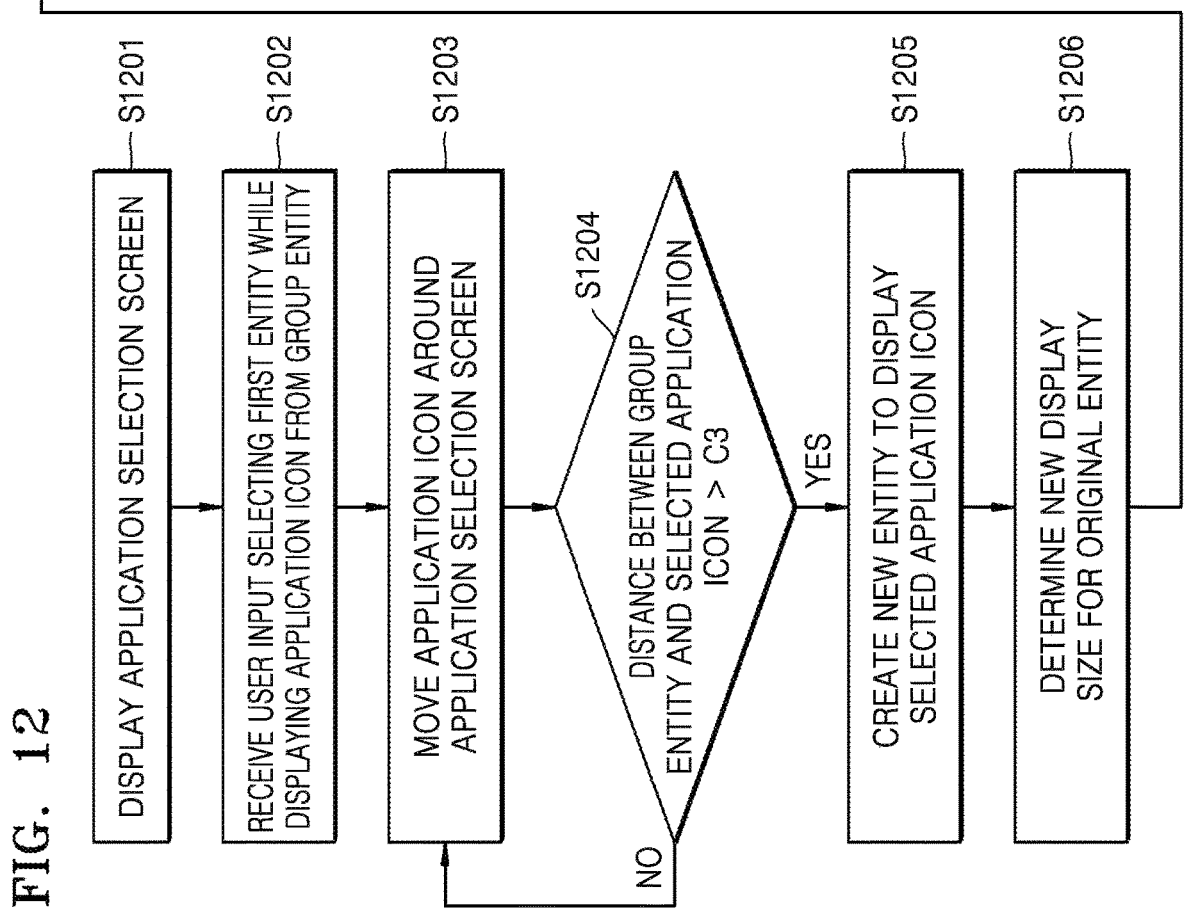
FIG. 12 is a flowchart of a method of splitting an entity in an application selection screen, according to an exemplary embodiment.

FIG. 12 is a flowchart showing a method of splitting an entity in an application selection screen, according to an exemplary embodiment. The method may be used to split a group entity as shown in FIGS. 3A to 3C.

In operation S1201, an application selection screen such as the one shown in FIG. 7 is displayed.

In operation S1202, a display device receives a user input selecting an application icon from a group entity. The user input is received as a touch event through a touch-screen display unit, but in other exemplary embodiments a different type of interface may be used.

In operation S1203, the display device moves the application icon around the application selection screen in response to the user input dragging the icon while continuing to select the application icon, and as in the method of FIG. 11, repeatedly checks the distance from the original entity while moving the selected application icon.

In operation S1204, the display device determines whether a distance between a group entity and the selected application icon is greater than the third threshold distance C3.

If the icon is dragged further than the third threshold distance C3 from the entity, in operation S1205, the display device creates a new entity to display the selected application icon.

In operation S1206, the display device determines a new display size for the original entity based on how many of the application icons will remain in the original entity once the selected application icon has been removed. Although in the exemplary embodiment the new display size for the original entity is calculated after creating the new entity, in other exemplary embodiments operations S1205 and S1206 may be performed in the reverse order.

In operation S1207, the display device displays visual feedback in the form of a split animation to indicate creation of the new entity containing the selected icon, as shown in FIG. 3B. During operation S1207, the display device subsequently displays further visual feedback to indicate merging of the original entity and the new entity, in response to the user input dragging the selected application icon closer than the fourth threshold distance C4 while the user continues to hold the application icon. In the exemplary embodiment the third threshold distance C3 used to initiate splitting is the same as the first threshold distance C1 used to initiate merging, but in other exemplary embodiments third threshold distance C3 and the first threshold distance C1 may be different.

In operation S1208, the display device receives a release event, indicating that the user has released the application icon. If the application icon is released further than the fourth threshold distance C4 from the original entity, the display device determines that the release event constitutes a request to remove the selected application icon from the group entity.

In operation S1209, the display device determines whether the distance between the group entity and the selected application entity is greater than the fourth threshold distance C4.

In operation S1210, the display device may continue to display the application selection screen by displaying the original entity with the selected application icon removed, and displaying the selected application icon in the newly-created entity.

On the other hand, in response to the selected application icon being released within the fourth threshold distance C4 from the original entity in operation S1208, in operation S1211, the display device continues to display the application selection screen without splitting the original entity, that is, with the selected application icon retained in the original entity. Again, the fourth threshold distance C4 used to confirm splitting may be the same as or different from the second threshold distance C2 used to confirm merging in FIG. 11.

Figure 13:
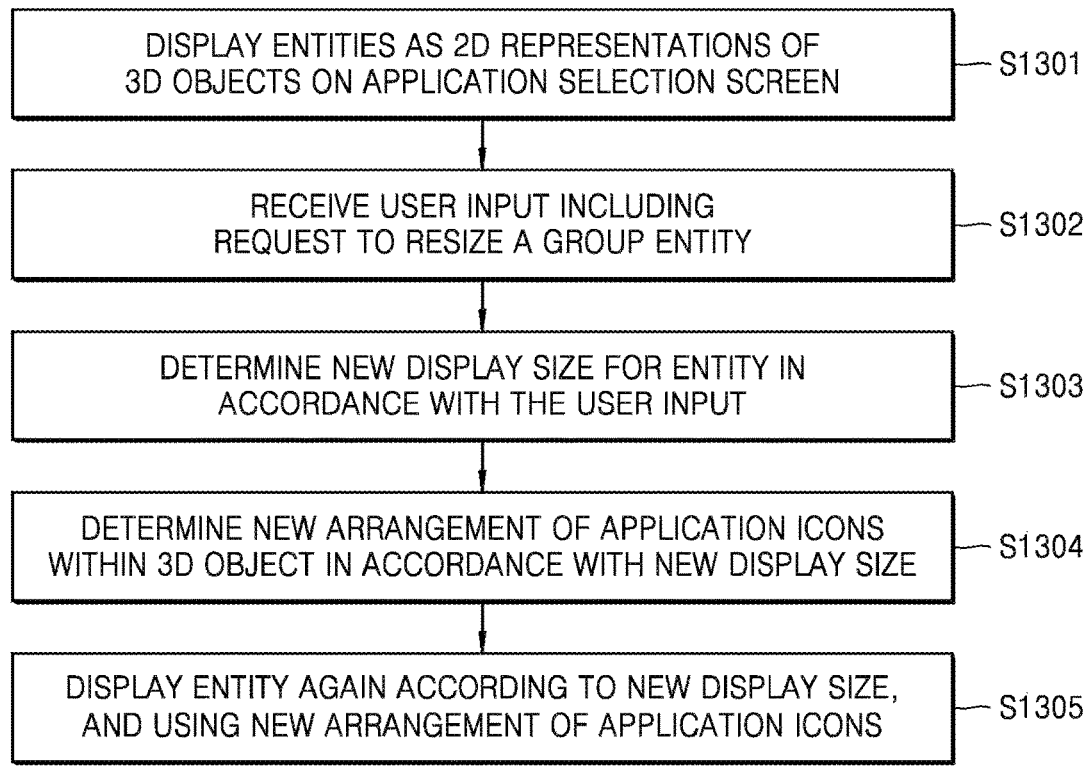
FIG. 13 is a flowchart of a method of resizing an entity in an application selection screen, according to an exemplary embodiment.

FIG. 13 is a flowchart showing a method of resizing an entity in an application selection screen, according to an exemplary embodiment. The method may be used to resize the entity and rearrange application icons as shown in FIGS. 6A and 6B.

In operation S1301, the application selection screen such as the one shown in FIG. 7 is displayed. A display device displays entities as 2D representations of 3D objects on the application selection screen.

In operation S1302, a user input including a request to resize a group entity is received, for example, in the form of a pinch-to-zoom gesture as described above. Next, in operation S1303, the display device determines a new display size for the entity in accordance with the user input.

In operation S1304, the display device determines a new arrangement of the application icons within the 3D object in accordance with the new display size. As described above, in some exemplary embodiments the display device may be configured to only rearrange the application icons if the display size of the entity has increased or decreased by more than a threshold value.

In operation S1305, the display device displays the entity again according to the new display size, and using the new arrangement of application icons, while continuing to display the application selection screen.

Figure 14:
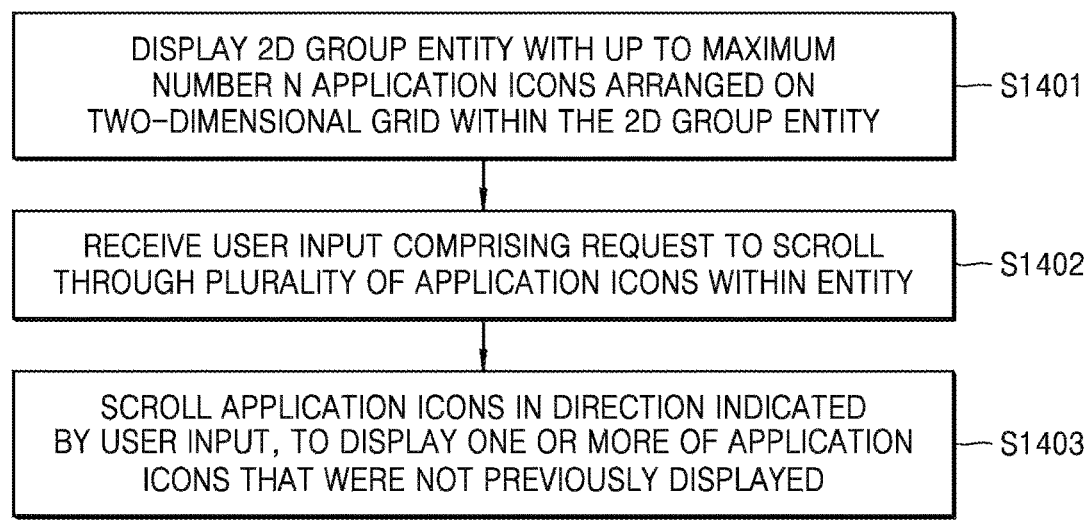
FIG. 14 is a flowchart of a method of scrolling through application icons within a two-dimensional entity in an application selection screen, according to an exemplary embodiment.

FIG. 14 is a flowchart showing a method of scrolling through application icons within a two-dimensional entity in an application selection screen, according to an exemplary embodiment. The method may be used with a 2D group entity such as the one illustrated in FIGS. 8A to 8C.

In operation S1401, a display device displays a 2D group entity with up to a maximum number N application icons arranged on a two-dimensional grid within the 2D group entity, such that when one of entities includes the application icons more than the maximum number, any application icons exceeding the limit N are not displayed.

In operation S1402, the display device receives a user input including a request to scroll through the plurality of application icons within the entity.

In response to the user input, in operation S1403, the display device scrolls the application icons in a direction indicated by the user input, to display one or more of the application icons that were not previously displayed.

Figure 15:
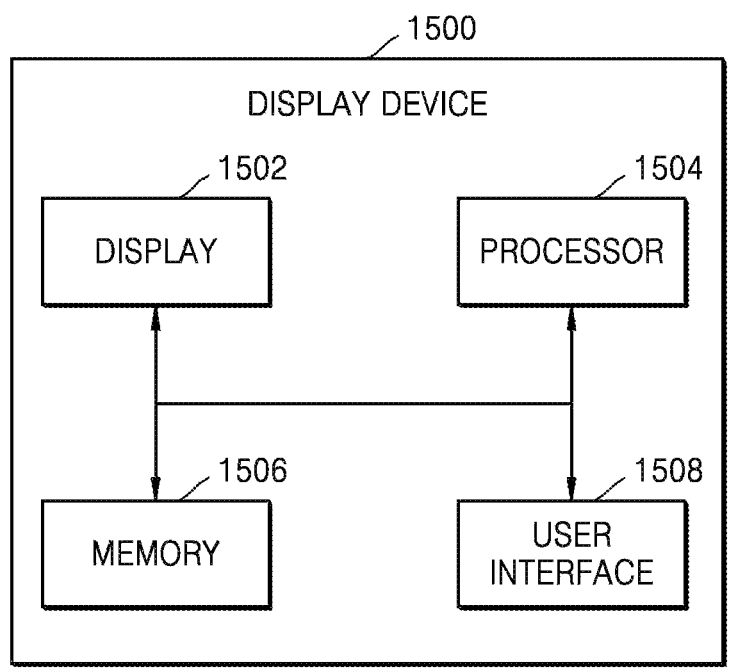
FIG. 15 illustrates a display device capable of executing a plurality of applications, according to an exemplary embodiment.

FIG. 15 illustrates a display device capable of executing a plurality of applications, according to an exemplary embodiment. A display device 1500 includes a display 1502, a processor 1504 including one or more processors, a memory 1506 including a computer-readable storage medium, and a user interface 1508. For example, the user interface 1508 may be a touch-screen module integrated with the display 1502. The memory 1506 may store computer program instructions, which when executed by the processor 1504, cause the display device 1500 to perform any of the above-described methods. Although the display 1502 and the user interface 1508 are shown as being included in the display device 1500 in FIG. 15, in other exemplary embodiments the display 1502 and/or the user interface 1508 may be physically separate. For example, the processor 1504 may be configured to communicate with the display 1502 and/or the user interface 1508 over a wireless interface.

Figure 16:
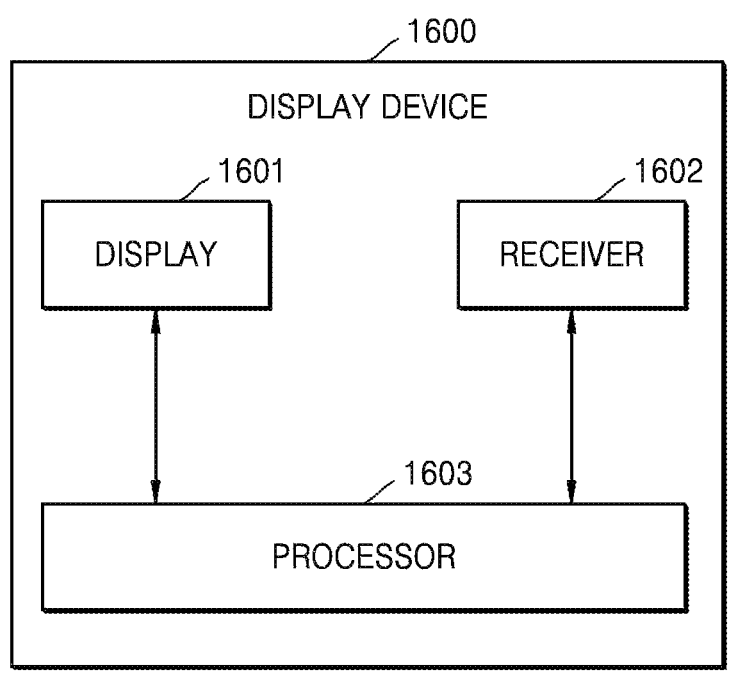
FIG. 16 illustrates a display device, according to an exemplary embodiment.

FIG. 16 illustrates a display device 1600, according to an exemplary embodiment. The display device 1600 includes a display 1601, a receiver 1602, and a processor 1603.

The display 1601 may display application icons in accordance with the control of the processor 1603 or may display an application execution screen. The display 1601 may display one or more entities including the application icons on an application selection screen. The display 1601 may display a screen of merging or splitting the application icons in accordance with the control of the processor 1603.

The receiver 1602 may receive an input from a user. The receiver 1602 may receive a touch input, a keyboard input, a mouse input, etc. from the user. The receiving unit 1602 may receive the input from the user and transmit the input received from the user to the processor 1630.

The processor 1603 may control the display 1601. The processor 1603 may determine which screen to display on the display 1601 and control the display 1601 to display the determined screen.

The processor 1603 may receive the input of the user from the receiver 1602. The processor 1603 may determine an image that is to be displayed on the determined screen in accordance with the input of the user.

The processor 1603 may merge or split the application icons and may execute an application selected by the user.

If the processor 1603 receives a touch input on a first entity among the entities and an input of dragging the first entity to a second entity, the processor 1603 may merge the first entity and the second entity, create a merged entity, and display the application icon included in the first entity and the application icon included in the second entity inside the merged entity.

The processor 1603 may determine a display size of the merged entity based on the number of the application icons included in the merged entity and display the merged entity in accordance with the determined display size.

The processor 1603 may add an upper limit to the display size and limit a maximum size of the merged entity.

The processor 1603 may determine a maximum number of the application icons that are to be displayed inside the merged entity and only application icons less than or equal to the maximum number inside the merged entity may be displayed.

The processor 1603 may display the entities as 3D objects and display two or more of the application icons included in the entities to indicate different depths.

The processor 1603 may determine a new arrangement of the two or more application icons in accordance with a user input for the rotation of the entities and may display the two or more application icons again using the new arrangement, while continuing to display the application selection screen.

The processor 1603 may display the entities as 2D objects, may determine a new arrangement of the application icons included in the entities in accordance with a user input of scrolling through the entities, and may display the application icons included in the entities using the new arrangement, while continuing to display the application selection screen.

The processor 1603 may touch a first application icon in a third entity including first and second application icons, may receive an input of dragging the first application icon outside the third entity, may create a new fourth entity, and display the third entity including the second application icon and the fourth entity including the first application icon.

The processor 1603 may determine a new display size of the entities based on a user input for resizing the entities and may display the entities in accordance with the determined display size.

The exemplary embodiments have been described in which application icons are contained within entities that may be dynamically manipulated to arrange the icons in a more efficient manner, for example by creating group entities which include one or more application icons while occupying a relatively small display area.

Some exemplary embodiments are implemented in a multi-touch device, with the result that multiple users may simultaneously execute different applications and manipulate displayed entities, for example by merging, splitting, rotating and/or zooming different ones of the displayed entities. As an example, one user may drag an entity towards a group entity in order to merge two entities, whilst another user simultaneously drags an application icon out of the same group entity in order to create a new entity.

The device according to the exemplary embodiments may include a processor, a memory for storing program data and executing it, a permanent storage unit such as a disk drive, a communications port for handling communications with external devices, and user interface devices, including a touch panel, keys, buttons, etc. When software modules or algorithms are involved, these software modules may be stored as program instructions or computer readable codes executable on a processor on a computer-readable medium. Examples of the computer readable recording medium include magnetic storage media (e.g., ROM, floppy disks, hard disks, etc.), and optical recording media (e.g., CD-ROMs, or DVDs). The computer readable recording medium can also be distributed over network coupled computer systems so that the computer readable code is stored and executed in a distributed fashion. This media can be read by the computer, stored in the memory, and executed by the processor.

Exemplary embodiments may be described in terms of functional block components and various processing steps. Such functional blocks may be realized by any number of hardware and/or software components configured to perform the specified functions. For example, the exemplary embodiments may employ various integrated circuit components, e.g., memory elements, processing elements, logic elements, look-up tables, and the like, which may carry out a variety of functions under the control of one or more microprocessors or other control devices. Similarly, where the elements of the exemplary embodiments are implemented using software programming or software elements, the exemplary embodiments may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the exemplary embodiments could employ any number of conventional techniques for electronics configuration, signal processing and/or data processing and the like. The words "mechanism" and "element" are used broadly and are not limited to mechanical or physical embodiments, but can include software routines in conjunction with processors, etc.

The particular implementations shown and described herein are illustrative examples and are not intended to otherwise limit the scope of the inventive concept in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

The use of the terms "a" and "an" and "the" and similar referents in the context of describing the exemplary embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the exemplary embodiments, and does not pose a limitation on the scope of the inventive concept unless otherwise claimed. Numerous modifications and adaptations will be readily apparent to those of ordinary skill in this art without departing from the spirit and scope of the exemplary embodiments.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method of operating a display device, the method comprising:
    displaying, by at least one processor of the display device, at least one entity displayed as enclosing a plurality of application icons in the inside, as part of an application selection screen of the display device;
    obtaining, by the at least one processor, a first touch input selecting an application icon from among the plurality of application icons displayed as enclosed in the at least one entity, while continuing to display the application selection screen;
    executing, by the at least one processor, an application associated with the selected application icon, based on the first touch input on the application selection screen, including the at least one entity enclosing the plurality of application icons;
    obtaining, by the at least one processor, a second touch input selecting a first entity and dragging the first entity to a second entity;
    identifying, by the at least one processor, a distance between the selected first entity and the second entity while selecting and dragging the first entity, wherein a first application icon of the plurality of application icons is displayed inside the first entity, and a second application icon of the plurality of application icons is displayed inside the second entity;
    displaying a first visual feedback informing that the selected first entity and the second entity will be merged if the selected first entity is released while the distance is less than a first threshold distance;
    merging the first entity with the second entity to create a merged entity and displaying the first application icon and the second application icon inside the merged entity if the selected first entity is the released while the distance is less than the first threshold distance; and
    displaying a second visual feedback informing that the merging is cancelled if the selected first entity is dragged further apart from the second entity than a second threshold distance while the first visual feedback is displayed.

2. The method of claim 1, further comprising:
    identifying, by the at least one processor, a display size of the merged entity based on a number of application icons displayed inside in the merged entity; and
    displaying, by the at least one processor, the merged entity in accordance with the identified display size, wherein the merged entity has the same shape as the another entity shown on the application selection screen but the merged entity is adjusted in size in comparison to the another entity, and display of the merged entity is shown as the merged entity is adjusted in size.

3. The method of claim 2, wherein the identifying, by the at least one processor, of the display size comprises limiting, by the at least one processor, the display size of the merged entity to a maximum display size, wherein the maximum display size is based on an upper limit.

4. The method of claim 1, further comprising:
    determining, by the at least one processor, a maximum number of application icons to be displayed inside the merged entity; and
    displaying, by the at least one processor, a number of application icons inside the merged entity, wherein the number of application icons is less than the maximum number.

5. The method of claim 1, further comprising:
    determining, by the at least one processor, a new arrangement of the plurality of application icons in accordance with a user input for rotation of the at least one entity as a three-dimensional object; and
    displaying, by the at least one processor, the plurality of application icons using the new arrangement, while continuing to display the application selection screen.

6. The method of claim 1, wherein the displaying, by the at least one processor, comprises:
    displaying, by the at least one processor, at least one entity as a two-dimensional object;
    determining, by the at least one processor, a new arrangement of the plurality of application icons included in the at least one entity as the two-dimensional object in accordance with a user input of scrolling through the at least one entity; and
    displaying, by the at least one processor, the plurality of application icons included in the at least one entity as the two dimensional object using the new arrangement, while continuing to display the application selection screen.

7. The method of claim 1, further comprising:
    obtaining, by the at least one processor, an input selecting a first application icon displayed inside a first entity, wherein a second application icon is displayed inside the first entity;
    obtaining, by the at least one processor, an input dragging the first application icon outside the first entity;
    creating, by the at least one processor, a second entity; and
    displaying, by the at least one processor, the second application icon inside the first entity and the first application icon inside the second entity.

8. The method of claim 1, further comprising:
    determining a new display size of the at least one entity based on a user input for resizing the at least one entity; and
    displaying the at least one entity in accordance with the determined new display size,
    wherein the resizing is displayed as the of the least one entity changes in size.

9. The method of claim 1, wherein the plurality of application icons are displayed to be partially overlapped with each other.

10. The method of claim 1, wherein the displaying of the first visual feedback starts before the selected first entity and the second entity overlaps.

11. A display device comprising:
a display; and
at least one processor configured to:
control the display to display at least one entity displayed as enclosing a plurality of application icons in the inside, as part of an application selection screen of the display device;
obtain a first touch input selecting an application icon from among the plurality of application icons displayed as enclosed in the at least one entity, while continuing to display the application selection screen;
execute an application associated with the selected application icon, based on the first touch input on the application selection screen, including the at least one entity enclosing the plurality of application icons;
obtain a second touch input selecting a first entity and dragging the first entity to a second entity;
identify a distance between the selected first entity and the second entity while selecting and dragging the first entity, wherein a first application icon of the plurality of application icons is displayed inside the first entity, and a second application icon of the plurality of application icons is displayed inside the second entity;
control the display to display a first visual feedback informing that the selected first entity and the second entity will be merged if the selected first entity is released while the distance is less than a first threshold distance;
merge the first entity with the second entity to create a merged entity and display the first application icon and the second application icon inside the merged entity if the selected first entity is the released while the distance is less than the first threshold distance; and
control the display to display a second visual feedback informing that the merging is cancelled if the selected first entity is dragged further apart from the second entity than a second threshold distance while the first visual feedback is displayed.

12. The display device of claim 11, wherein the at least one processor is configured to:
determine a display size of the merged entity based on a number of application icons included in the merged entity; and
display the merged entity in accordance with the determined display size wherein the merged entity has the same shape as another entity shown on the application selection screen but the merged entity is adjusted in size in comparison to the another entity, and display of the merged entity is shown as the merged entity is adjusted in size.

13. The display device of claim 12, wherein the at least one processor is configured to: limit the display size of the merged entity to a maximum display size, wherein the maximum display size is based on an upper limit.

14. The display device of claim 11, wherein the at least one processor is configured to:
determine a maximum number application icons to be displayed inside the merged entity; and
display a number of application icons inside the merged entity, wherein the number of application icons is less than the maximum number.

15. The display device of claim 11, wherein the at least one processor is configured to:
determine a new arrangement of the first application icon and the second application icon in accordance with a user input for rotation of the at least one entity; and
display the first application icon and the second application icon using the new arrangement, while continuing to display the application selection screen.

16. The display device of claim 11, wherein the at least one processor is configured to:
display at least one entity as a two-dimensional object;
and determine a new arrangement of application icons included in the at least one entity as the two-dimensional object in accordance with a user input of scrolling through the application icons in the at least one entity as the two-dimensional object; and
display the application icons included in the at least one entity as the two-dimensional object using the new arrangement, while continuing to display the application selection screen.

17. The display device of claim 11, wherein the at least one processor is configured to:
start to display the first visual feedback before the selected first entity and the second entity overlaps.

18. A non-transitory computer-readable storage medium having stored thereon computer program instructions which, when executed in one or more processors, perform the method of claim 1.

* * * * *